United States Patent Office 3,692,643
Patented Sept. 19, 1972

---

3,692,643
ELECTROFLUORINATION PROCESS USING THIOESTERS
Dewey George Holland, Allentown, Pa., assignor to Air Products and Chemicals, Inc., Allentown, Pa.
No Drawing. Filed May 17, 1971, Ser. No. 144,253
Int. Cl. C07b *29/06;* C07c *51/58, 143/70*
U.S. Cl. 204—59 R
18 Claims

ABSTRACT OF THE DISCLOSURE

The presence of a small amount of a thioester of aromatic or aliphatic carboxylic acids in the electrolyte during the electrofluorination of alkyl substituted or unsubstituted, aromatic or aliphatic, sulfonic or carboxylic, acid halides decreases the rate of electrode decomposition, raises the yield of perfluorinated product and decreases the formation of viscous materials.

BACKGROUND OF THE INVENTION

This invention relates to an electrochemical process for making fluorocarbon acid fluorides, and more particularly, the invention relates to a process for the electrofluorination of alkyl substituted or unsubstituted, aromatic or aliphatic, carboxylic or sulfonic, acid halides in a cell containing an electrode pack having electrodes, a current conducting electrolyte solution comprising anhydrous liquid hydrogen fluoride and a small amount of a thioester of an aromatic or an aliphatic carboxylic acid.

The process for the electrofluorination of alkyl substituted or unsubstituted, aromatic or aliphatic, sulfonic or carboxylic, acid halides is well known. Prior procedures have been described in U.S. Letters Patents Nos. 2,519,983; 2,717,871; and 2,732,398; and in the literature, e.g., in "Fluorine Chemistry," volume I (Academic Press, Inc., 1950). The conventional electrofluorination processes described by the prior art utilize an electrode pack, comprising alternating, closely spaced (⅛ inch to ¼ inch) electrodes—generally iron cathode plates alternating with nickel anode plates. A voltage is applied to the cell in the range of approximately 4 to 8 volts D.C. The cell can be operated substantially at atmospheric pressure and at a temperature between —20 and 19 degrees C., although higher pressures and temperatures may be used. The organic starting material may suitably be initially present in admixture with the electrolyte solution of hydrogen fluoride in an amount between about 0.5 percent and about 20 percent by weight, based on the weight of the hydrogen fluoride. Both the organic starting material and the hydrogen fluoride electrolyte are replenished from time to time as required. A refrigerated condenser is used to condense out most of the hydrogen fluoride vapors which are evolved with the exit gas mixture, and the liquified hydrogen fluoride is then drained back into the cell. The resulting fluorinated product of the process is relatively insoluble in the hydrogen fluoride electrolyte solution and either settles to the bottom of the cell from which it can be drained or evolves from the cell in admixture with the hydrogen and other gaseous products, depending upon its volatility.

Referring to the aforementioned patents, U.S. Letters Patent No. 2,717,871 relates particularly to the electrochemical fluorination of carboxylic acid halides (compounds containing one or more carbonyl halide groups); and U.S. Letters Patent No. 2,732,398 relates particularly to the electrochemical fluorination of sulfonic acid halides (compounds containing one or more sulfonyl halide groups). The electrochemical fluorination process results in perfluorination by replacement of all carbon bonded hydrogen atoms by fluorine atoms, including the saturation of aromatic rings or other unsaturated structures by addition of fluorine, such that a saturated acid fluoride product is obtained. The resulting product compound can be used to make a variety of useful perfluorocarbon derivatives. By way of example, the product can be hydrolyzed with water, reacted with ammonia to produce the corresponding amide, or can be reacted with an alcohol to produce an ester. The saturated fluorocarbon structure is highly stable and inert. When this structure contains five or more carbon atoms it results in a material with a fluorocarbon "tail" which is both hydrophobic and oleophobic and which is characterized by marked surface active properties. Extensive industrial usage, however, of the resulting perfluorocarbon product compound has been hindered by the high cost of such compound. Accordingly, any invention which will materially reduce the cost of manufacturing such a compound is of significant economic importance.

Three principal problems connected with electrofluorination processes have been: (a) the rate of electrode decomposition, (b) low product yields and (c) the formation of undesirable viscous materials as a side reaction. In spite of constant and continual efforts to overcome or minimize these problems, the problems have never been satisfactorily eliminated.

Formation of tarry material is particularly prevalent when an aromatic starting compound is employed. The formation of such tarry material has resulted in relatively short runs before it becomes necessary to shut down an operating cell in order to replace a fouled electrode pack or fouled electrolyte solution. Moreover, the formation and presence of such tarry material renders it difficult to recover the desired product compound in pure form.

SUMMARY OF THE INVENTION

It is an object of this invention to decrease the rate of electrode decomposition in electrofluorination processes.

Another object of this invention is to increase the product yield obtained in electrofluorination processes per unit of electrical energy (electrical efficiency).

Still another object of this invention is to decrease the formation of viscous material (i.e. tarry material) during electrofluorination processes.

Yet another object of this invention is to improve electrofluorination processes by the incorporation of a thioester of an aromatic or an aliphatic carboxylic acid.

It is still a further object of the present invention to improve the conductivity of electrolyte solution by the inclusion of small amounts of a thioester of an aromatic or an aliphatic carboxylic acid in the electrolyte solution.

In accordance with the present invention, electrofluorination is accomplished by the addition to the electrolytic solution of a thioester of an aromatic or an aliphatic carboxylic acid having the following formula:

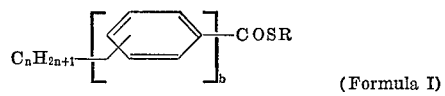

(Formula I)

where $n$ is an integer from 0 to 10 when $b$ is equal to 1 and $n$ is an integer from 1 to 10 when $b$ is 0; $b$ is an integer of 0 or 1; and R is a $C_1$ to $C_6$ alkyl group. The thioester of the aromatic or aliphatic carboxylic acid is advantageously present in an amount between about 0.5 and about 6 percent by weight based on the weight of the charge (starting compound) to the electrofluorination cell.

DESCRIPTION OF THE PREFERRED EMBODIMENT

The alkyl groups in the structure shown in Formula I may have straight chains or branch chains and may be primary, secondary or tertiary. When the aromatic ring is present (i.e., $b$ is 1), and $C_nH_{2n+1}$ hydrocarbon group may be attached to the aromatic ring in either the ortho, para or meta position.

Typical examples of thioester additives coming within the scope of Formula I are the following materials:

$CH_3COSCH_3$
$CH_3CH_2COS(CH_2)_2CH_3$
$C_8H_{17}COS(CH_2)_4CH_3$
$C_6H_5COS(CH_2)_5CH_3$
$3\text{—}CH_3\text{-(}C_6H_4\text{)-}COS(CH_2)_2CH_3$
$4\text{—}CH_3(CH_2)_4\text{-(}C_6H_4\text{)-}COSCH_3$ The preferred thioester compounds are thio(n-butyl)benzoate; thio(n-butyl)butyrate and thio(n-butyl) octanoate.

A minor proportion by weight of the additive, relative to the organic starting material, is employed. Initially, between 0.1 to 10 percent by weight of the thioester additive, based on the weight of hydrogen fluoride present, can be added to the cell. When the desired alkyl substituted or unsubstituted, aromatic or aliphatic, carboxylic or sulfonic, acid halide is added to the cell, additional thioester additive is placed in the cell such that between about 0.5 and about 6 percent by weight of thioester additive based on the acid halide charge is present in the cell at all times during the process. Thus, while large amounts of the thioester additive can be incorporated initially with either the electrolyte or starting compound, the preferred procedure is to add a small amount initially to the electrolyte and then continue to add additive to the electrolyte during the process. Continuous addition of the additive is required since the additive is fluorinated during the operation of the process; making it necessary to replenish the additive from time to time during an extended run in order to maintain the concentration of starting compound and additive within the desired range. One method of insuring that there is sufficient additive present in the electrolyte solution during operation of the process is to monitor its concentration in the electrolyte by vapor phase chromatography.

Pure anhydrous liquid hydrogen fluoride is nonconductive. Due to this fact, it has previously been necessary to add sodium fluoride, or some other carrier electrolyte, to the cell in order to provide a conductive solution. Since the additive of the present invention also serves as a carrier electrolyte, the thioester additive makes it unnecessary to employ a carrier electrolyte such as sodium fluoride (which promotes extensive electrode decomposition) for the electrochemical fluorination process.

The alkyl substituted or unsubstituted, aromatic or aliphatic, carboxylic or sulfonic, acid halide starting compound which can be employed in the practice of the present improved process includes starting compounds having the following general formula:

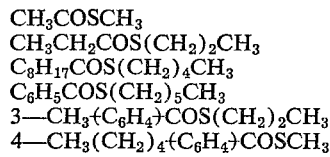

(Formula II)

where $n$ is an integer between 0 and 10 when $b$ is 1 and $n$ is an integer between 1 and 10 when $b$ is 0; $b$ is either 0 or 1; and Y is CO or $SO_2$ and Z is Cl or F. Examples of starting materials defined by Formula II include the following compounds:

$CH_3COF$
$C_6H_5SO_2Cl$
$C_7H_{15}\text{-(}C_6H_4\text{)-}COF$
$C_3H_7\text{-(}C_6H_4\text{)-}SO_2F$
$C_{10}H_{21}COCl$
$(CH_3)_2CH\text{-(}C_6H_4\text{)-}SO_2Cl$ Thus, starting compounds defined by Formula II include benzoyl chloride, benzene sulfonyl chloride and p-isoheptyl benzoyl chloride. Preferred starting materials include benzoyl fluoride, butyryl fluoride, octanoyl fluoride and octane sulfonyl fluoride. The starting compound can be added to the liquid hydrogen fluoride either before or after the liquid hydrogen fluoride is introduced into the cell.

Preferably, in the electrofluorination of the above starting compounds, the electrolyte contains a small amount of thioalkyl ester of the starting compound thus providing a relationship between charge and additive. While this is not essential to the practice of the present invention, this preferred practice affords a perfluorinated product of the same structure as the main electrofluorination charge.

It is important to note that the described thioester additives need only be present inthe electrolyte solution. It has been found that these thioester additives are stable and readily recoverable from anhydrous hydrogen fluoride. They also are believed to possess the advantageous characteristic of not reacting in anhydrous hydrogen fluoride with the aromatic carboxylic or sulfonic acid fluorides present during the electrofluorination, nor are they believed to react with the desired perfluorinated products which are present in the electrolyte solutions during the electrofluorination process.

The invention will be further illustrated by the following specific examples, it being understood that there is no intention to be necessarily limited by any details thereof since variations can be made within the scope of the invention. In each of the examples set forth below, Cell I refers to a 6,500 cc. Monel Cell containing $\frac{1}{16}$ inch thick nickel anodes and cathodes in which an outer body glycol refrigerant is used to maintain the Cell at an operating temperature of from 50 to 67 degrees F. and in which the Monel reflux condenser is operated at from $-40$ to $-60$ degrees F. Cell II is a cell of identical construction to Cell I except that the electrolyte volume is 4,500 cc. The organic and electrical yields set forth in the following examples are based on the theoretical equations for the charge and the assumption that the molecular weight of the fluorinated product is essentially the weight of the perfluorinated saturated carboxylic or sulfonic acid fluoride corresponding to the skeletal structure of the charge. Subsequent to the initial charging of the cell, additional starting compound and additive are replaced based on the consumption of starting compound according to the amount of current consumed and the theoretical electrofluorination equation. These subsequent additions are performed at twenty-four (24) hour intervals.

EXAMPLE 1

(A) The electrofluorination of benzene sulfonyl chloride was conducted in Cell I. The anode-cathode electrode pack had $\frac{1}{8}$ inch spacing and a total anode area of 4.245 square feet. An initial charge of 450 grams of benzene sulfonyl chloride was added to the anhydrous hydrogen fluoride. The run was conducted at from 6.8 to 8.6 volts for a period of 371.6 Faradays, at an average current density of 10.8 amperes per square foot. The initial charge and subsequent additions totaled 14.2 moles of benzene sulfonyl chloride. The liquid fluorinated product obtained from the bottom of the cell was 2,970 grams. This represents a 37.4% electrical efficiency and a 58.3% organic efficiency. The rate of loss of nickel from the electrode pack was in excess of 25 grams/1,000 ampere hours.

(B) When the above experiment is repeated and 2%, by weight, of thio (n-propyl) butyrate is added along with the organic charge, the electrical and organic yields is increased to about 60% and the loss of nickel from the electrode pack is decreased to less than 1 gram/1,000 ampere hours. The current density is increased to 20 amperes per square foot at 7.5 volts.

EXAMPLE 2

(A) The electrofluorination of p-isoheptyl benzoyl chloride was conducted in the apparatus described in Example 1. The initial charge of 450 grams of p-isoheptyl benzoyl chloride in anhydrous hydrogen fluoride was electrofluorinated at between 6.2 and 8.0 volts for a period of 259.9 Faradays at a current density of 7.9 amperes per square foot. The electrical yield was 48.7% and the organic yield was 41.3% for liquid perfluorinated product obtained. This product was analyzed by ethanol esterification and distillation and was found to be 62% esterifiable. The weight loss from the electrodes was at a rate of 31 grams/1,000 ampere hours.

(B) The above experiment is repeated with additions of thio ethyl butyrate so that concentrations of at least 0.09 percent of this thioester is maintained in the electrolyte, as determined by vapor phase chromatography of the electrolyte solution. The resulting organic yield is raised to above 60% while the weight loss of the electrode pack is less than 2 grams/1,000 ampere hours.

EXAMPLE 3

As a comparative example to that of the invention as described in Example 4, forty-six moles of para(n-butyl) benzoyl chloride was electrofluorinated in the apparatus described in Example 1 at 8.0 to 8.8 volts for a period of 1085 Faradays, at a current density of 3.5 amperes per square foot. An initial 10% charge was used and subsequent additions were made at 24 hour intervals. Liquid perfluorinated product was obtained at an electrical efficiency of 78.3% and an organic efficiency of 57.0%. The run was continually hampered by inability to remove product from the bottom of the cell due to viscous sludge formation. At the termination of the run, 751 grams of partially fluorinated nickel containing solids were scraped from the electrode plates.

EXAMPLE 4

The electrofluorination of 3.6 moles of para(n-butyl) benzoyl chloride is conducted in Cell II at ¼ inch plate spacing and a total anode area of 1.967 square feet. Three weight percent of thio(n-butyl)benzoate is added along with the organic charge. The resultant electrofluorination is conducted at 7.0 to 7.5 volts while maintaining a current density of 20 amperes per square foot. The loss of weight from the electrode pack is less than 2 grams/1,000 ampere hours. Moreover, no sludge is formed during the run and no film is found on the electrode plates at the termination of the run.

EXAMPLE 5

(A) Benzoyl chloride (14.6 moles) is electrofluorinated in Cell I at ¼ inch electrode spacing, 1.967 square foot anode area. An initial charge of 10% benzoyl chloride is employed. A current density of only 4.7 amperes per square foot is drawn at 7.0 to 7.5 volts. The draining of liquid product from the cell bottom is severely hampered by the appearance of viscous sludge in the product drain line. A nitrogen pressure of 20 p.s.i. is needed in order to extrude the product and sludge mixture from the bottom of the unit. The system becomes inoperative at the 159 Faraday point. At this time the electrical efficiency for production of liquid product is 13.3% and the organic efficiency is 9.7%.

(B) Using identical apparatus, and an initial 10 weight percent of benzoyl chloride charge, to which had been added 6 weight percent of thio(n-butyl)benzoate, a sludge free run averaging 6.5 to 7.5 volts and a current density of 20 amperes per square foot was easily maintained for a period of 1013 Faradays. No sludge appearance in the liquid product and 17.3 kilograms of liquid perfluorinated product was obtained from the 8.9 kilograms of benzoyl chloride and 0.5 kilogram of thio(n-butyl)benzoate employed as the cell charge. This yield represents a greater than 80% organic and electrical efficiency for the production of perfluorinated liquid product.

EXAMPLE 6

Benzoyl fluoride (69.2 moles), to which had been added 3 weight percent of thio(n-butyl)benzoate, was electrofluorinated in Cell I at ¼ inch electrode spacing, 1.967 square foot anode area. An initial charge of 9.7% benzoyl fluoride, containing 0.3% thio(n-butyl)benzoate, was employed. The electrofluorination was conducted for a period of 1,032 Faradays, at an average current density of 18.3 amperes per square foot at 6.0 to 7.5 volts. No viscous sludge formation was observed. Liquid fluorinated product (18.8 kilograms) was obtained; an 85.3% organic efficiency and 88.9% electrical efficiency. The rate of loss of nickel from the electrode pack was less than 2.2 grams/1,000 ampere hours.

Similar results were obtained when the following cell charges and thioester additives were substituted for the cell charge and thioester additive of Example 6.

Cell charge:
   $CH_3COCl$
   $CH_3(CH_2)_3COCl$
   $C_7H_{15}COF$
   $C_8H_{17}SO_2F$
   $C_{10}H_{21}COF$
   $C_6H_{13}SO_2Cl$
   $(CH_3)_2CHCOCl$
   $C_8H_{17}SO_2F$ Thioester additive:
   $CH_3CH_2COSCH_2CH_3$
   $C_6H_5COS(CH_2)_5CH_3$
   $C_6H_5COS(CH_2)_3CH_3$
   $C_7H_{15}COS(CH_2)_3CH_3$
   $CH_3(CH_2)_3COSCH_3$
   $3-CH-(C_6H_4)-COS(CH_2)_2CH_3$
   $4-CH_3(CH_2)_6-(C_6H_4)-COSCH_3$
   $C_{10}H_{21}COS(CH_2)_3CH_3$ where, $-(C_6H_4)-$ is phenylene, and $C_6H_5$ is phenyl.

From the foregoing, it will be seen that this invention is generally well adapted to obtain all of the ends and objects hereinabove set forth, together with other advantages which are obvious and which are inherent therein. The addition of thioester additive not only decreases the rate of electrode decomposition, increases the electrolyte conductivity, and increases the yield of perfluorinated products, but also effectively reduces or eliminates operating difficulties due to the formation of viscous materials during the electrofluorination of alkyl substituted or unsubstituted, aromatic or aliphatic, sulfonic or carboxylic, acid halides. Prior to the adoption of the present invention, the formation of tarry materials polluted the electrolyte solution, formed a dense tarry deposit on electrode plates and also contaminated the fluorinated product, thereby complicating recovery and purification of the desired product.

As seen by the above examples, the improvement resulting from the use of the present invention has very materially increased the electrical and organic yield efficiency of electrofluorination processes while decreasing the rate of decomposition of the electrodes and materially reducing or virtually eliminating the formation of viscous sludge or tarry material.

Obviously, many other modifications and variations of the invention as hereinbefore set forth may be made without departing from the spirit and scope thereof.

What is claimed is:

1. An electrochemical process of making fluorocarbon acid fluorides by electrolyzing, in a cell containing an electrode pack, an electrolyte solution comprising anhydrous liquid hydrogen fluoride mixed with a hydrocarbon acid halide starting compound having the formula:

where $n$ is an integer between 0 and 10 when $b$ is 1 and $n$ is an integer between 1 and 10 when $b$ is 0; $b$ is either 0 or 1; and Y is CO or $SO_2$ and Z is Cl or F, which process is characterized by the feature that the electrolyte solution contains a small proportion, relative to the hydrocarbon acid halide starting compound, of an additive having the following formula:

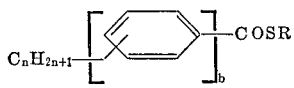

where $n$ is an integer from 0 to 10 when $b$ is equal to 1 and $n$ is an integer from 1 to 10 when $b$ is 0; $b$ is an integer of 0 or 1; and R is a $C_1$ to $C_6$ alkyl group.

2. A process according to claim 1 in which the additive is thio (n-butyl) benzoate.
3. A process according to claim 1 wherein the additive is thio (n-butyl) octanoate.
4. A process according to claim 1 wherein the additive is thio (n-butyl) butyrate.
5. A process according to claim 1 in which the additive is thioethyl butyrate.
6. A process according to claim 1 wherein the starting compound is benzoyl fluoride.
7. A process according to claim 1 wherein the starting compound is para (n-butyl benzoyl chloride.
8. The process according to claim 1 wherein the starting compound is octane sulfonyl fluoride.
9. A process according to claim 1 wherein the starting compound is octanoyl fluoride.
10. The process for the electrofluorination of a starting compound having the formula:

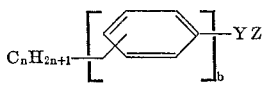

where $n$ is an integer between 0 and 10 when $b$ is 1 and $n$ is an integer between 1 and 10 when $b$ is 0; $b$ is either 0 or 1; and Y is CO or $SO_2$ and Z is Cl or F, which process comprises electrolyzing the acid halide charge starting compound in a cell containing nickel anodes and a current conducting electrolyte solution comprising anhydrous liquid hydrogen fluoride, wherein about 0.5 to about 6 percent by weight of an additive, based on the weight of the acid halide charge, is present in the electrolyte; said additive having the formula:

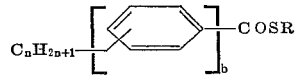

where $n$ is an integer from 0 to 10 when $b$ is equal to 1 and $n$ is an integer from 1 to 10 when $b$ is 0; $b$ is an integer of 0 or 1; and R is a $C_1$ to $C_6$ alkyl group.

11. A process according to claim 10 in which the additive is thio (n-butyl) benzoate.
12. A process according to claim 10 wherein the addi- is thio (n-butyl) octanoate.
13. A process according to claim 10 wherein the additive is thio (n-butyl) butyrate.
14. A process according to claim 10 wherein the additive is thioethyl butyrate.
15. A process according to claim 10 wherein the starting compound is benzoyl fluoride.
16. A process according to claim 10 wherein the starting compound is para (n-butyl) benzoyl chloride.
17. The process according to claim 10 wherein the starting compound is octane sulfonyl fluoride.
18. The process according to claim 10 wherein the starting compound is octanoyl fluoride.

References Cited

UNITED STATES PATENTS

| | | | |
|---|---|---|---|
| 2,717,871 | 9/1955 | Scholberg et al. | 204—59 R |
| 2,732,398 | 1/1956 | Brice et al. | 204—59 R X |
| 3,028,321 | 4/1962 | Danielson et al. | 204—59 R |

F. C. EDMUNDSON, Primary Examiner